US012566477B2

(12) United States Patent
Cole et al.

(10) Patent No.: US 12,566,477 B2
(45) Date of Patent: Mar. 3, 2026

(54) DETACHABLE CONNECTION ARRANGEMENT FOR CONNECTING ELECTRONIC DEVICES

(71) Applicant: Huawei Technologies Co., Ltd., Shenzhen (CN)

(72) Inventors: James Robert Thomas Cole, Kista (SE); Otto Huittinen, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/578,879

(22) PCT Filed: Jul. 14, 2021

(86) PCT No.: PCT/EP2021/069551
§ 371 (c)(1),
(2) Date: Jan. 12, 2024

(87) PCT Pub. No.: WO2023/284951
PCT Pub. Date: Jan. 19, 2023

(65) Prior Publication Data
US 2024/0329694 A1     Oct. 3, 2024

(51) Int. Cl.
*G06F 1/16*          (2006.01)
*H01F 7/02*          (2006.01)
(52) U.S. Cl.
CPC .......... *G06F 1/1679* (2013.01); *G06F 1/1632* (2013.01); *H01F 7/02* (2013.01)

(58) Field of Classification Search
CPC .... G06F 1/1679; G06F 1/1632; G06F 1/1626; H01F 7/02
See application file for complete search history.

(56) References Cited

U.S. PATENT DOCUMENTS

| | | | | |
|---|---|---|---|---|
| 7,599,178 B2 * | 10/2009 | Huang | ................. | G06F 1/1626 |
| | | | | 361/679.28 |
| 7,817,414 B2 * | 10/2010 | Chou | .................. | H01R 13/633 |
| | | | | 361/679.56 |
| 8,817,456 B2 * | 8/2014 | Lin | ...................... | G06F 1/1669 |
| | | | | 361/679.29 |
| 8,922,994 B2 * | 12/2014 | Zawacki | .............. | G06F 1/1683 |
| | | | | 70/159 |
| 9,013,868 B2 * | 4/2015 | Kuo | ..................... | G06F 1/1632 |
| | | | | 361/679.44 |

(Continued)

FOREIGN PATENT DOCUMENTS

EP          3467613 A1     4/2019

*Primary Examiner* — Rockshana D Chowdhury
(74) *Attorney, Agent, or Firm* — Conley Rose, P.C.

(57) ABSTRACT
A connection arrangement for detachably interconnecting an electronic device and an additional device along a first axis has a first connection assembly and a second connection assembly disposed in the electronic device and the additional device respectively. The first connection assembly includes a stationary structure and a pivotable element. The second connection assembly has a partially movable structure and a slidable element. The pivotable element is configured to engage the slidable element and the partially movable structure is configured to engage the stationary structure such that the first connection assembly and the second connection assembly can interlock with each other in a direction along a second axis perpendicular to the first axis.

20 Claims, 3 Drawing Sheets

(56)　　　　　　　References Cited

U.S. PATENT DOCUMENTS

| | | | |
|---|---|---|---|
| 9,047,049 B2 * | 6/2015 | Yang | G06F 1/1626 |
| 9,141,146 B2 * | 9/2015 | Ke | G06F 1/1679 |
| 9,310,848 B2 * | 4/2016 | Fujino | G06F 1/1681 |
| 9,335,792 B2 * | 5/2016 | Matsumoto | G06F 1/166 |
| 9,398,707 B2 * | 7/2016 | Chang | G06F 1/1681 |
| 9,483,076 B2 | 11/2016 | Liang et al. | |
| 9,651,993 B2 | 5/2017 | Huang et al. | |
| 9,665,125 B2 | 5/2017 | Browning et al. | |
| 9,851,751 B2 * | 12/2017 | Sugiura | G06F 1/1626 |
| 10,185,360 B1 * | 1/2019 | Yang | G06F 1/1632 |
| 10,301,845 B2 * | 5/2019 | Hsu | E05B 47/023 |
| 10,303,214 B2 | 5/2019 | Rosen et al. | |
| 10,437,291 B2 * | 10/2019 | Hsu | G06F 1/1654 |
| 10,840,637 B2 | 11/2020 | Bai et al. | |
| 2013/0050934 A1 * | 2/2013 | Zhou | G06F 1/1632 |
| | | | 361/679.41 |
| 2014/0133080 A1 | 5/2014 | Hwang et al. | |
| 2015/0192957 A1 * | 7/2015 | Lee | G06F 1/1632 |
| | | | 361/679.58 |
| 2018/0181166 A1 * | 6/2018 | Katsuyama | G06F 1/16 |

\* cited by examiner

A3    A2

A1

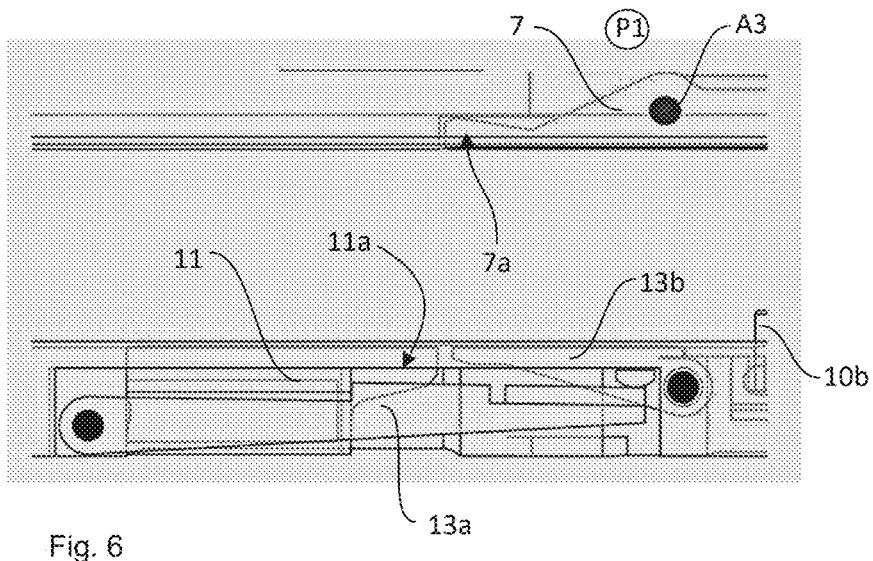
Fig. 6
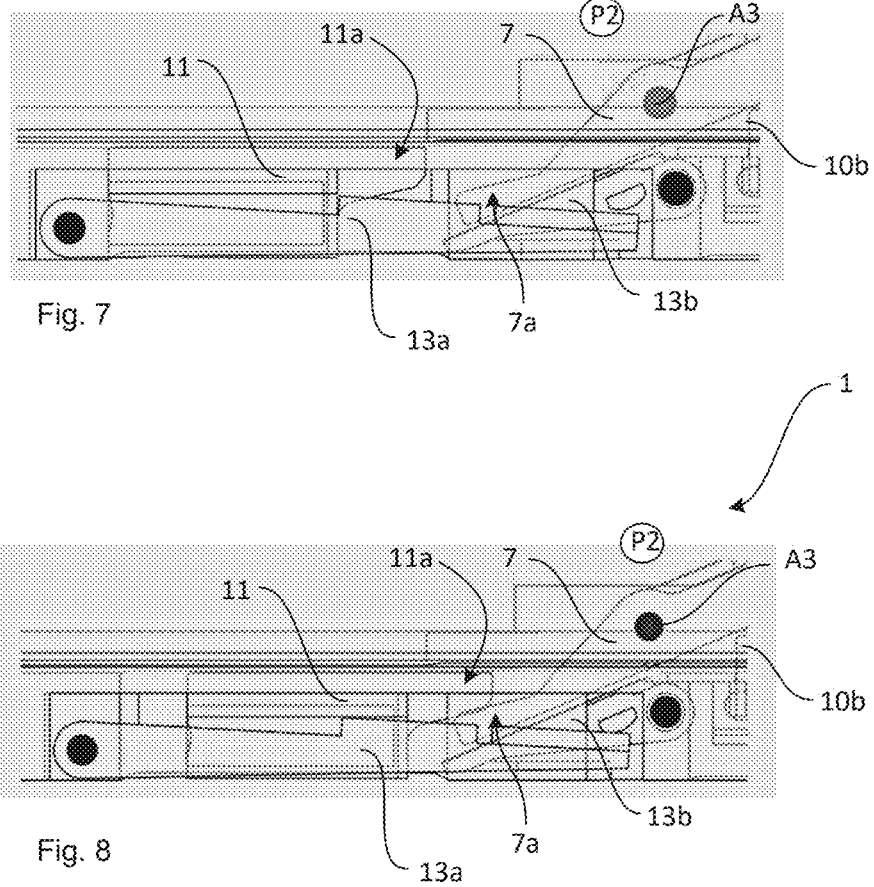
Fig. 7
Fig. 8

DETACHABLE CONNECTION ARRANGEMENT FOR CONNECTING ELECTRONIC DEVICES

CROSS-REFERENCE TO RELATED APPLICATIONS

This is a U.S. National Stage of International Patent Application No. PCT/EP2021/069551 filed on Jul. 14, 2021, which is hereby incorporated by reference in its entirety.

TECHNICAL FIELD

The disclosure relates to a connection arrangement for detachably interconnecting an electronic device and a further device, and a method for detachably interconnecting an electronic device and a further device.

BACKGROUND

Two-in-one devices such as tablets with detachable keyboards are becoming more and more common. Usually, such devices are interconnected by means of protruding tabs or hooks, arranged along a long edge of at least one of the devices. The tabs or hooks both align and interlock with a corresponding recess in the opposite device, and the tabs, hooks, and recesses are typically always visible.

The protruding tabs or hooks are easily damaged due to mechanical impact, and the open recesses gather dust and other particles, such that, with time, the connection may become less well-functioning or even break.

Hence, there is a need for providing an improved connection arrangement.

SUMMARY

It is an object to provide an improved connection arrangement for detachably interconnecting an electronic device and a further device. The foregoing and other objects are achieved by the features of the independent claims. Further implementation forms are apparent from the dependent claims, the description, and the figures.

According to a first aspect, there is provided a connection arrangement for detachably interconnecting an electronic device and a further device along a first axis, the connection arrangement comprising: a first connection assembly arranged in a first slot in one of the electronic device and the further device, the first connection assembly comprising a stationary structure and at least one pivotable element; and a second connection assembly arranged in a second slot in the other of the electronic device and the further device, the second connection assembly comprising an at least partially movable structure and at least one slidable element. The at least one pivotable element is configured to engage the slidable element within the second slot, and the at least one partially movable structure is configured to engage the stationary structure within the first slot, such that the first connection assembly and the second connection assembly are interlocked with each other in a direction along a second axis perpendicular to the first axis.

This solution allows an interconnection which is at least partially retracted, invisible, and hence protected from mechanical impact or wear, when the devices are separated. Furthermore, the solution facilitates automatic interconnection when appropriate sections of the devices are placed adjacent each other. The interconnection is achieved by elements engaging along several axes, wherefore the connection is robust.

In a possible implementation form of the first aspect, the stationary structure is configured to generate movement of the movable structure in a first direction towards the stationary structure along the second axis, the movable structure being configured to engage the stationary structure in response to the movement such that the movable structure is aligned with the stationary structure along the first axis, facilitating automatic as well as aligned engagement.

In a further possible implementation form of the first aspect, the pivotable element is configured to pivot around a third axis perpendicular to the first axis and the second axis, such that the pivotable element pivots between a retracted position and a protruding position, the pivotable element engaging the slidable element when in the protruding position, allowing the connection arrangement, and hence the devices, to be as thin as possible.

In a further possible implementation form of the first aspect, the second connection assembly further comprises a compression spring configured to generate a spring force in a second direction along the second axis, the spring force maintaining at least a part of the movable structure in a retracted position when the spring force exceeds a movement force generated by the stationary structure on the movable structure in the first direction, providing a simple and cheap way of retracting the movable structure.

In a further possible implementation form of the first aspect, the movable structure comprises a first magnetic assembly and at least one pin, and wherein the stationary structure comprises a second magnetic assembly and at least one recess configured to accommodate the pin, the connection arrangement being configured to self-align by means of the recess accommodating the pin as the movable structure is moved towards the stationary structure, facilitating an interconnection which is secure yet still easily breakable by manual force.

In a further possible implementation form of the first aspect, the pin is operably interconnected with the first magnetic assembly by means of a plurality of levers or guiding arms, allowing the operational force required to be adapted and guided in accordance with specific needs.

In a further possible implementation form of the first aspect, the pin is stationary relative the second slot, such that only the first magnetic assembly is movable, facilitating a mechanically simpler solution.

In a further possible implementation form of the first aspect, the pin is configured to engage the pivotable element such that the pivotable element pivots from the retracted position to the protruding position as the pin moves into the recess, such that the alignment of structures automatically also facilitates locking engagement.

In a further possible implementation form of the first aspect, the first magnet assembly comprises at least one first permanent magnet or a first magnetic material, and the second magnet assembly comprises at least one second permanent magnet or a second magnetic material, the first permanent magnet being configured to attract the second permanent magnet or the second magnetic material, or the second permanent magnet being configured to attract the first magnetic material, allowing a simple yet reliable interconnection which does not require power supply.

In a further possible implementation form of the first aspect, the movable structure comprises two pins, each pin being arranged adjacent opposite ends of the first magnet assembly, and wherein the stationary structure comprises two recesses, each recess being arranged adjacent opposite ends of the second magnet assembly, facilitating a symmetric and stable interconnection along the edges of the devices.

In a further possible implementation form of the first aspect, the slidable element is configured to engage the pivotable element when in the protruding position, the slidable element being configured to move parallel with the first axis, the slidable element comprising a free end configured to engage, and interlock with, a protruding end of the pivotable element, facilitating two-dimensional engagement and, hence, a more stable interconnection.

In a further possible implementation form of the first aspect, the second connection assembly further comprises a retaining arrangement and an actuating element, the retaining arrangement being configured to releasably engage the slidable element and hold the slidable element in a retracted position when the further device is detached from the electronic device, the actuating element being configured to move the slidable element to an extended position in response to the retaining arrangement releasing the slidable element and the further device being attached to the electronic device, allowing automatic engagement and interlocking in two dimensions.

In a further possible implementation form of the first aspect, the retaining arrangement comprises a retaining element and a lever element, the pivotable element being configured to engage the lever element when the pivotable element pivots from the retracted position to the protruding position, the pivoted lever element engaging the retaining element such that the slidable element is released, allowing a reliable solution which is thin and can be easily adapted to any desired configuration.

In a further possible implementation form of the first aspect, the actuating element is one of a compression spring, a solenoid, or a shape-memory alloy wire, facilitating simple yet reliable actuation without requiring complex systems.

In a further possible implementation form of the first aspect, the retaining element is configured to release the slidable element by means of pivoting movement of the pivotable element or by means of an actuator disengaging or engaging the retaining element, allowing a simple and reliable solution which can be activated manually or automatically.

In a further possible implementation form of the first aspect, the first connection assembly is configured to at least partially form a first slot cover, and the second connection assembly is configured to at least partially form a second slot cover, when the further device is detached from the electronic device, preventing ingress of dirt or other particles into the interior of the devices when detached.

In a further possible implementation form of the first aspect, the pivotable element of the first connection assembly forms the first slot cover and a surface of the pin forms the second slot cover, reducing the number of components needed and, hence, the complexity of the arrangement.

In a further possible implementation form of the first aspect, the pin and the recess having center axes extending along directions of movement of the movable structure, facilitating simultaneous alignment.

In a further possible implementation form of the first aspect, the first connection assembly and the second connection assembly being configured to engage when moved towards each other along the second axis and to disengage when moved away from each other along the second axis, providing simple ways of attaching and detaching the devices.

In a further possible implementation form of the first aspect, the first connection assembly and the second connection assembly are arranged along edges of the electronic device and the further device, allowing the devices to be pivotable relative each other.

In a further possible implementation form of the first aspect, the electronic device is a tablet and the further device is a keyboard, allowing the devices to function together as a laptop.

According to a second aspect, there is provided an electronic device system comprising an electronic device, at least one further device, and the connection arrangement according to the above.

This allows the devices of the system to be interconnected by an arrangement which is at least partially retracted, invisible, and hence protected from mechanical impact or wear, when the devices are separated. Furthermore, the solution facilitates automatic interconnection when appropriate sections of the devices are placed adjacent each other. The interconnection is achieved by elements engaging along several axes, wherefore the connection is robust.

According to a third aspect, there is provided a method of detachably interconnecting an electronic device and a further device along a first axis, a first connection assembly being arranged in a first slot in one of the electronic device and the further device, the first connection assembly comprising at least a stationary structure and at least one pivotable element, and a second connection assembly arranged in a second slot in the other of the electronic device and the further device, the second connection assembly comprising at least one movable structure and at least one slidable element. The method comprises the steps of moving a section of one of the electronic device and the further device comprising the first slot in a first direction along a second axis perpendicular to the first axis, towards a section of the other of the electronic device and the further device comprising the second slot, generating movement of the movable structure along the second axis, towards the stationary structure, by means of an attracting force between the stationary structure and the movable structure, aligning the movable structure with the stationary structure by the movable structure engaging the stationary structure, the movable structure engaging and pivoting the pivotable element of the first connection assembly and simultaneously the pivotable element of the first connection assembly engaging the second connection assembly such that the slidable element slides in a third direction parallel with the first axis, the slidable element engaging and interlocking the pivotable element such that the first connection assembly is interlocked with the second connection assembly.

Such a method allows the devices to be interconnected by an arrangement which is at least partially retracted, invisible, and hence protected from mechanical impact or wear, when the devices are separated. Furthermore, the method allows automatic interconnection when appropriate sections of the devices are placed adjacent each other. The interconnection is achieved by elements engaging along several axes, wherefore the connection is robust.

In a possible implementation form of the third aspect, the method further comprises the steps of moving the slidable element in a fourth direction parallel with the first axis such that the slidable element disengages the pivotable element, applying a manual force on at least one of the electronic device and the further device in a second direction along the second axis, away from the other of the electronic device and the further device, the manual force being higher than the attracting force, the movable structure disengaging the pivotable element such that the pivotable element pivots
back to a retracted position wherein the pivotable element
forms a first slot cover, and simultaneously the movable
structure being moved in the second direction along the
second axis to a retracted position wherein the movable
structure forms a second slot cover. This allows the devices
to be separated using only manual force, and the connection
arrangement as well as interior of the devices to be protected
from mechanical impact or wear when the devices are
separated.

These and other aspects will be apparent from the
embodiment(s) described below.

BRIEF DESCRIPTION OF THE DRAWINGS

In the following detailed portion of the present disclosure,
the aspects, embodiments, and implementations will be
explained in more detail with reference to the example
embodiments shown in the drawings, in which:

FIG. 6 shows a schematic side view showing the inter-
action between the pivotable element, the slidable element,
and retaining elements of a connection arrangement in
accordance with an example of the embodiments of the
disclosure, wherein the electronic device and further device
are fully separated;

FIG. 7 shows the interaction between the pivotable ele-
ment, the slidable element, and retaining elements of the
connection arrangement of FIG. 6, wherein the electronic
device and further device are in an intermediate and party
engaged position;

FIG. 8 shows the interaction between the pivotable ele-
ment, the slidable element, and retaining elements of the
connection arrangement of FIGS. 6 and 7, wherein the
electronic device and further device are fully engaged and
interlocked.

DETAILED DESCRIPTION

Figures 3, 4, 5:
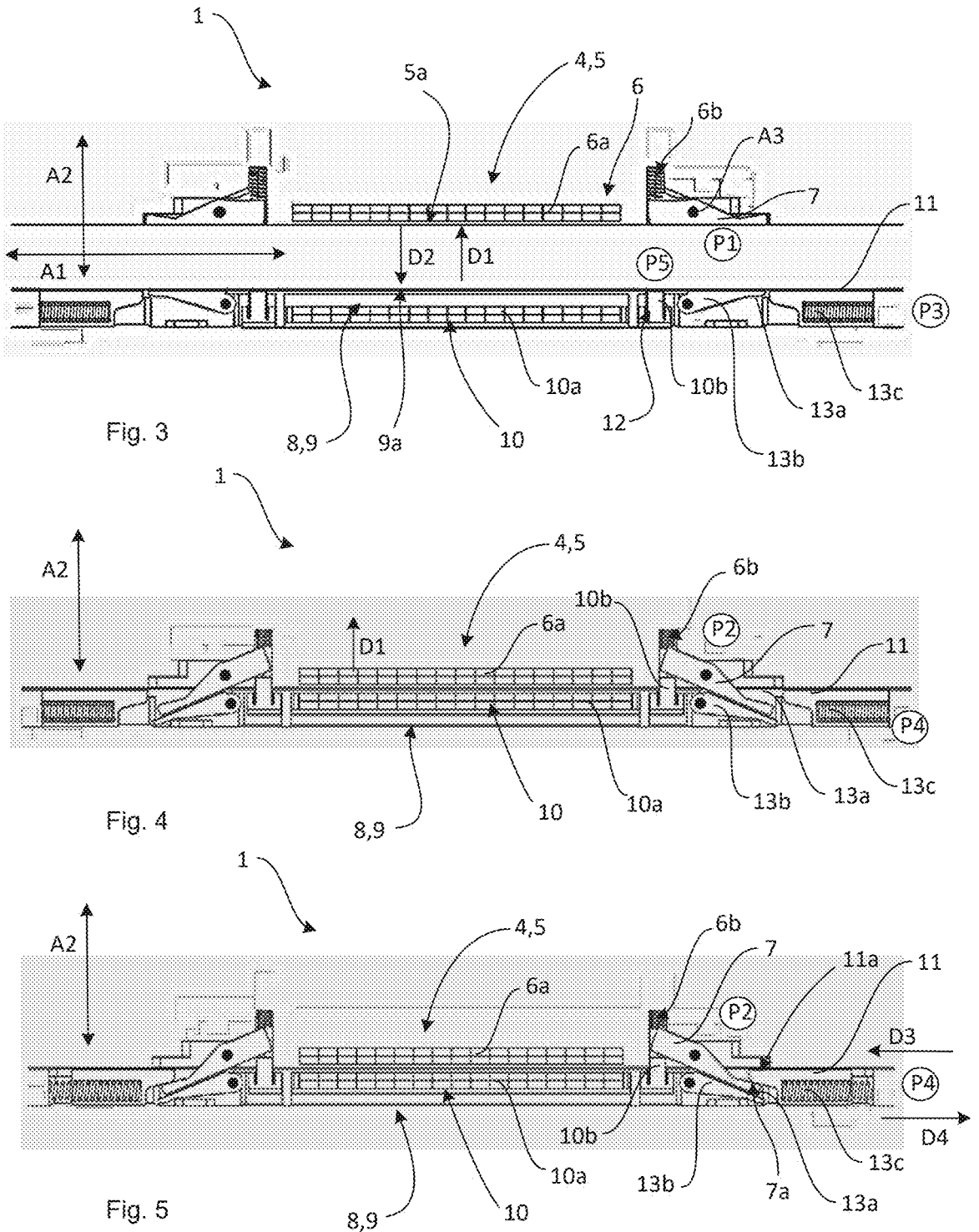
FIG. 3 shows a schematic side view of a connection
arrangement in accordance with an example of the embodi-
ments of the disclosure, wherein the electronic device and
further device are fully separated.
FIG. 4 shows the connection arrangement of FIG. 3,
wherein the electronic device and further device are in an
intermediate and party engaged position.
FIG. 5 shows the connection arrangement of FIGS. 3 and
4, wherein the electronic device and further device are fully
engaged and interlocked.

FIGS. 3 to 5 show a connection arrangement 1 for
detachably interconnecting an electronic device 2 and a
further device 3 along a first axis A1, the connection
arrangement 1 comprising a first connection assembly 4
arranged in a first slot 5 in one of the electronic device 2 and
the further device 3, the first connection assembly 4 com-
prising a stationary structure 6 and at least one pivotable
element 7, and a second connection assembly 8 arranged in
a second slot 9 in the other of the electronic device 2 and the
further device 3, the second connection assembly 8 com-
prising an at least partially movable structure 10 and at least
one slidable element 11. The at least one pivotable element
7 is configured to engage the slidable element 11 within the
second slot 9, and the at least one partially movable structure
10 is configured to engage the stationary structure 6 within the first slot 5, such that the first connection assembly 4 and
the second connection assembly 8 are interlocked with each
other in a direction along a second axis A2 perpendicular to
the first axis A1.

Figure 1:
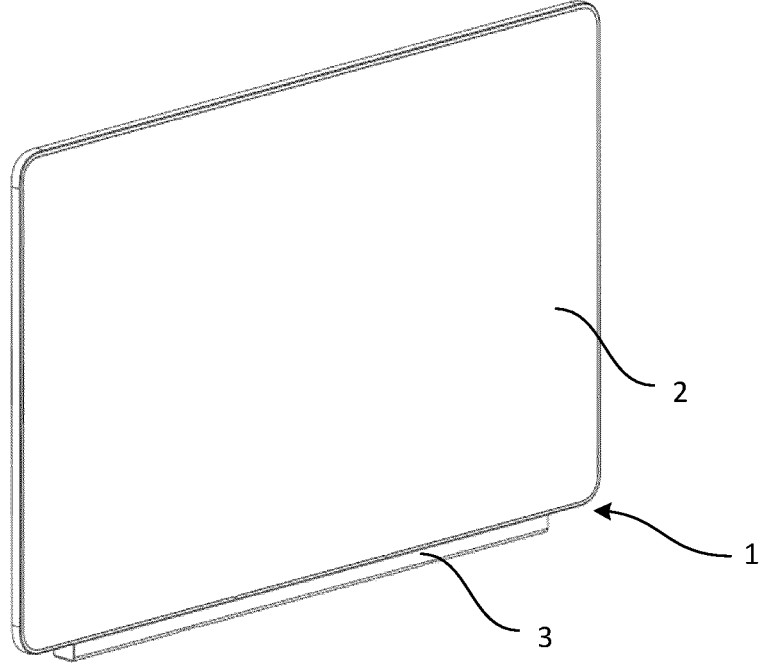
FIG. 1 shows a partial perspective view of an electronic
device system in accordance with an example of the embodi-
ments of the disclosure.
Figure 2:
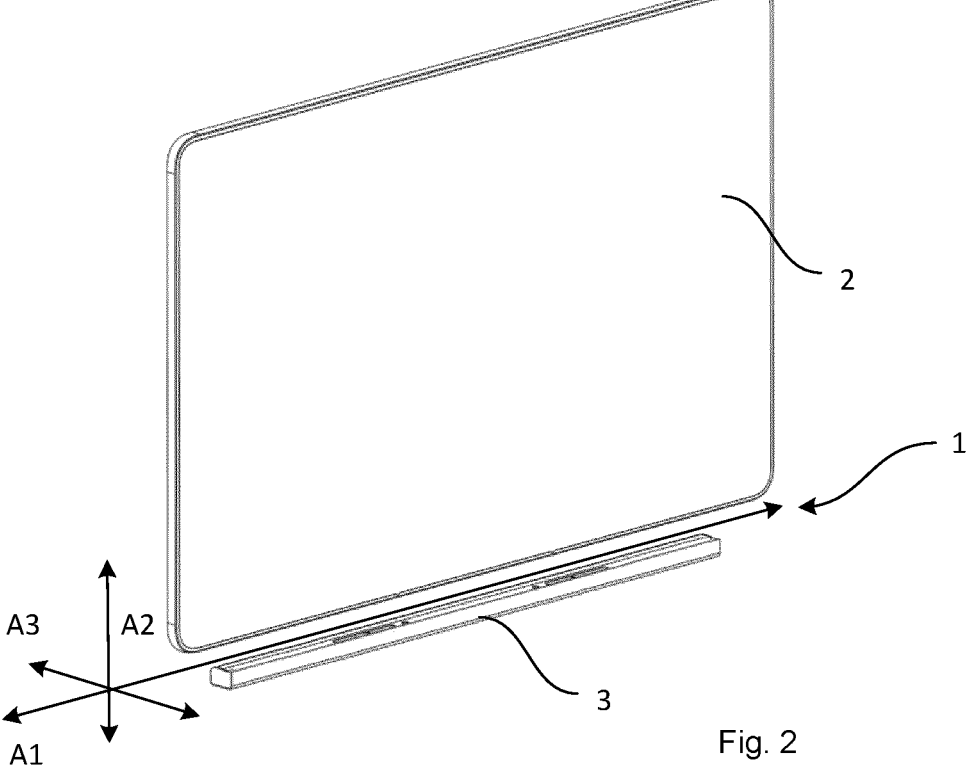
FIG. 2 shows an exploded view of the example of FIG. 1.

FIGS. 1 and 2 show an electronic device system com-
prising an electronic device 2, at least one further device 3,
and a connection arrangement 1 described in more detail
below. The electronic device 2 may be a tablet, and the
further device 3 may be a keyboard.

Nevertheless, any suitable combination is conceivable,
also including smartphones or laptops.

FIGS. 1 and 2 show the connection arrangement 1 for
detachably interconnecting an electronic device 2 and a
further device 3 along a first axis A1. The first axis A1
extends at least partially parallel with long edges of the
electronic device 2 and the further device 3, and optionally,
the electronic device 2 can be pivoted relative the further
device 3 around the first axis A1.

As shown in FIGS. 3 to 5, the connection arrangement 1
comprises a first connection assembly 4 and a second
connection assembly 8 configured to at least partially engage
each other and, as they engage, interlock. This interlocking,
results in the electronic device 2 and the further device 3
being connected to each other. The interlocking, and hence
connection, is releasable, as will be described further below.
The interlocking happens when the electronic device 2 and
the further device 3, and hence the first connection assembly
4 and the second connection assembly 8, are moved towards
each other in a direction along a second axis A2 perpen-
dicular to the first axis A1. The release happens when the
electronic device 2 and the further device 3, and hence the
first connection assembly 4 and the second connection
assembly 8, are moved away each other in an opposite
direction along the second axis A2.

The further device 3 may be configured to attach to the
electronic device 2 when the second connection assembly 8
engages the first connection assembly 4. The first connection
assembly 4 and the second connection assembly 8 may be
configured to engage when moved towards each other along
the second axis A2 and to disengage when moved away from
each other along the second axis A2. The first connection
assembly 4 and the second connection assembly 8 may be
arranged along edges of the electronic device 2 and the
further device 3.

The first connection assembly 4 is arranged in a first slot
5 in one of the electronic device 2 and the further device 3.
The first connection assembly 4 comprises a stationary
structure 6 and at least one pivotable element 7. The second
connection assembly 8 is arranged in a second slot 9 in the
other of the electronic device 2 and the further device 3. The
second connection assembly 8 comprises an at least partially
movable structure 10 and at least one slidable element 11.

The at least one pivotable element 7 is configured to
engage the slidable element 11 within the second slot 9, and
the at least one partially movable structure 10 is configured
to engage the stationary structure 6 within the first slot 5,
such that the first connection assembly 4 and the second
connection assembly 8 are interlocked with each other in a
direction along the second axis A2 perpendicular to the first
axis A1. In other words, at least a part of the first connection
assembly 4 protrudes into the second slot 9, and at least a
part of the second connection assembly 8 protrudes into the
first slot 5 when the first connection assembly 4 and the
second connection assembly 8 are interlocked, as shown in
FIG. 5. Hence, the further device 3 may be attached to the
electronic device 2 by means of engagement within the first
slot 5 and within the second slot 9.

The stationary structure 6 of first connection assembly 4 is configured to generate movement of the movable structure 10 in a first direction D1 towards the stationary structure 6 along the second axis A2, as shown in FIGS. 3 and 4. The movable structure 10 is configured to engage the stationary structure 6 in response to the movement such that the movable structure 10 is aligned with the stationary structure 6 along the first axis A1, as shown in FIGS. 4 and 5.

The second connection assembly 8 may further comprises a compression spring 12, as shown in FIG. 3, the compression spring 12 being configured to generate a spring force in a second direction D2 along the second axis A2, the second direction D2 being opposite to the first direction D1. The spring force maintains at least a part of the movable structure 10 in a retracted position when the spring force exceeds the movement force generated by the stationary structure 6 on the movable structure 10 in the first direction D1.

The movable structure 10 may comprise a first magnetic assembly 10a and at least one pin 10b. The stationary structure 6 may comprise a second magnetic assembly 6a and at least one recess 6b configured to accommodate the pin 10b. Hence, the connection arrangement 1 is configured to self-align by means of the recess 6b accommodating the pin 10b as the movable structure 10 is moved towards the stationary structure 6. The pin 10b and the recess 6b may have center axes extending along the directions of movement of the movable structure 10, i.e., parallel with the second axis A2.

The first magnet assembly 10a may comprise at least one first permanent magnet or a first magnetic material, and the second magnet assembly 6a may comprise at least one second permanent magnet or a second magnetic material. The first permanent magnet is configured to attract the second permanent magnet or the second magnetic material, or, oppositely, the second permanent magnet being configured to attract the first magnetic material.

The movable structure 10 may comprise two pins 10b, each pin 10b being arranged adjacent opposite ends of the first magnet assembly 10a, and the stationary structure 6 may comprise two recesses 6b, each recess 6b being arranged adjacent opposite ends of the second magnet assembly 6a.

The pin 10b may be operably interconnected with the first magnetic assembly 10a by means of a plurality of levers or guiding arms (not shown). Furthermore, the pin 10b may be stationary relative the second slot 9, such that only the first magnetic assembly 10a is movable (not shown).

The pivotable element 7 is configured to pivot around a third axis A3 perpendicular to the first axis A1 and the second axis A2, such that the pivotable element 7 pivots between a retracted position P1 and a protruding position P2, as shown in FIGS. 3 and 4, the pivotable element 7 engaging the slidable element 11 when in the protruding position P2.

The pin 10b of the movable structure 10 may be configured to engage the pivotable element 7 such that the pivotable element 7 pivots from the retracted position P1 to the protruding position P2 as the pin 10b moves into the recess 6b.

The slidable element 11 may be configured to engage the pivotable element 7 when in the protruding position P2, as shown in FIGS. 7 and 8. The slidable element 11 is configured to move parallel with the first axis A1, such that a free end 11a of the slidable element 11 engages, and interlocks with, a protruding end 7a of the pivotable element 7.

The second connection assembly 8 may further comprise a retaining arrangement 13a, 13b and an actuating element 13c, as shown in FIGS. 3 to 5. The retaining arrangement

13a, 13b is configured to releasably engage the slidable element 11 and hold the slidable element 11 in a retracted position P3 when the further device 3 is detached from the electronic device 2, see FIGS. 3 and 4. The actuating element 13c is furthermore configured to move the slidable element 11 to an extended position P4 in response to the retaining arrangement 13a, 13b releasing the slidable element 11 and the further device 3 being attached to the electronic device 2. Actuating element 13c may be one of a compression spring, as shown in FIGS. 3 to 5, a solenoid, or a shape-memory alloy wire.

As shown in FIGS. 6 to 8, the retaining arrangement 13a, 13b may comprise a retaining element 13a and a lever element 13b, the pivotable element 7 being configured to engage the lever element 13 when the pivotable element 7 pivots from the retracted position P1 to the protruding position P2, as shown in FIGS. 7 and 8, the pivoted lever element 13b engaging the retaining element 13a such that the slidable element 11 is released, as shown in FIG. 8. The retaining element 13a may be configured to release the slidable element 11 by means of pivoting movement of the pivotable element 7 or by means of an actuator disengaging or engaging the retaining element 13a.

As shown in FIG. 3, the first connection assembly 4 may be configured to at least partially form a first slot cover 5a, and the second connection assembly 8 may be configured to at least partially form a second slot cover 9a, when the further device is detached from the electronic device. The pivotable element 7 of the first connection assembly 4 may form the first slot cover 5a and a surface of the pin 10b may form the second slot cover 9a.

A method of detachably interconnecting the electronic device 2 and the further device 3 along a first axis A1 is illustrated in FIGS. 3 to 5. The first connection assembly 4 is arranged in the first slot 5 in one of the electronic device 2 and the further device 3, the first connection assembly 4 comprising at least the stationary structure 6 and at least one pivotable element 7. The second connection assembly 8 is arranged in the second slot 9 in the other of the electronic device 2 and the further device 3, the second connection assembly 8 comprising at least one movable structure 10 and at least one slidable element 11.

The method comprises a plurality of steps. In a first step, a section of one of the electronic device 2 and the further device 3 comprising the first slot 5 is moved in the first direction D1 along the second axis A2 perpendicular to the first axis A1, towards a section of the other of the electronic device 2 and the further device 3 comprising the second slot 9.

Movement of the movable structure 10 along the second axis A2, towards the stationary structure 6, is generated by means of an attracting force between the stationary structure 6 and the movable structure 10, the attracting force becoming stronger as the sections of the electronic device 2 and further device 3 move towards each other. The movable structure 10 is aligned with the stationary structure 6 by the movable structure 10 engaging the stationary structure 6, as shown in FIG. 4.

The movable structure 10 engages and pivots the pivotable element 7 of the first connection assembly 4 and, simultaneously, the pivotable element 7 of the first connection assembly 4 engages the second connection assembly 8 such that the slidable element 11 slides in a third direction D3 parallel with the first axis A1, as shown in FIG. 5.

The slidable element 11 engages and interlocks the pivotable element 7 such that the first connection assembly 4 is interlocked with the second connection assembly 8, as shown in FIGS. 5 and 8.

The method may further comprise the steps of moving the slidable element 11 in a fourth direction D4 parallel with the first axis A1 such that the slidable element 11 disengages the pivotable element 7. A manual force is applied, by the user, on at least one of the electronic device 2 and the further device 3 in a second direction D2 along the second axis A2, away from the other of the electronic device 2 and the further device 3, the manual force being higher than the attracting force. The attracting force becomes weaker as the electronic device 2 and further device 3 move away from each other.

The movable structure 10 disengages the pivotable element 7 such that the pivotable element 7 pivots back to a retracted position P1, shown in FIG. 6, wherein the pivotable element 7 forms a first slot cover 5a. Simultaneously, the movable structure 10 is moved in the second direction D2 along the second axis A2 to a retracted position P5 wherein the movable structure 10 forms a second slot cover 9a.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A connection arrangement comprising: a first connection assembly configured to dispose in a first slot one of an electronic device and an additional device and comprising: a stationary structure; and pivotable element; and a second connection assembly configured to dispose in a second slot in one of the electronic device and the additional device and comprising: a partially movable structure; and a slidable element; wherein the pivotable element is configured to engage with the slidable element within the second slot, and wherein the partially movable structure is configured to engage with the stationary structure within the first slot to enable the first connection assembly and the second connection assembly to interlock with each other in a direction along a second axis perpendicular to a first axis.

2. The connection arrangement of claim 1, wherein the stationary structure is configured to generate movement of the partially movable structure in a first direction towards the stationary structure along the second axis, and wherein the partially movable structure is further configured to engage with the stationary structure in response to the movement to cause the movable structure to be aligned with the stationary structure along the first axis.

3. The connection arrangement of claim 1, wherein the pivotable element is configured to:

pivot around a third axis perpendicular to the first axis and the second axis to cause the pivotable element to pivot between a retracted position and a protruding position; and engage with the slidable element when in the protruding position.

4. The connection arrangement of claim 1, wherein the second connection assembly further comprises a compression spring configured to generate a spring force in a second direction along the second axis, and wherein the spring force biases a part of the partially movable structure to maintain a retracted position when the spring force exceeds a movement force generated by the stationary structure on the partially movable structure in the first direction.

5. The connection arrangement of claim 1, wherein the partially movable structure comprises:

a first magnetic assembly; and a pin, wherein the stationary structure comprises:

a second magnetic assembly; and a recess configured to accommodate the pin, and wherein the connection arrangement is configured to self-align using the recess as the partially movable structure is moved towards the stationary structure.

6. The connection arrangement of claim 5, wherein the pin is configured to engage with the pivotable element to cause the pivotable element to pivot from a retracted position to a protruding position as the pin moves into the recess.

7. The connection arrangement of claim 5, wherein the first magnet assembly comprises a first permanent magnet or a first ferromagnetic material, wherein the second magnet assembly comprises second permanent magnet or a second ferromagnetic material, wherein the first permanent magnet is configured to attract the second permanent magnet or the second ferromagnetic material, or wherein the second permanent magnet is configured to attract the first ferromagnetic material.

8. The connection arrangement of claim 1, wherein the slidable element comprises a free end configured to engage and interlock with a protruding end of the pivotable element and is further configured to:

engage with the pivotable element when in a protruding position; and move parallel with the first axis.

9. The connection arrangement of claim 1, wherein the second connection assembly further comprises:

a retaining arrangement configured to releasably engage with the slidable element and hold the slidable element in a retracted position when the additional device is detached from the electronic device; and an actuating element configured to move the slidable element to an extended position in response to the retaining arrangement releasing the slidable element and the additional device being attached to the electronic device.

10. The connection arrangement of claim 9, wherein the actuating element is one of a compression spring, a solenoid, or a shape-memory alloy wire.

11. The connection arrangement of claim 9, wherein the retaining arrangement comprises a retaining element is configured to release the slidable element by means of by pivoting movement of the pivotable element or by an actuator disengaging or engaging the retaining element.

12. The connection arrangement of claim 1, wherein when the additional device is detached from the electronic device the first connection assembly is configured to partially form a first slot cover; and the second connection assembly is configured to partially form a second slot cover.

13. An electronic device A system comprising:
an electronic device;
an additional device; and
a connection arrangement comprising:
a first connection assembly configured to dispose in a first slot in one of the electronic device and the additional device and comprising:
a stationary structure; and
a pivotable element; and
a second connection assembly configured to dispose in a second slot in one of the electronic device and the additional device and comprising:
a partially movable structure; and
a slidable element,
wherein the pivotable element is configured to engage with the slidable element within the second slot, and
wherein the partially movable structure is configured to engage with the stationary structure within the first slot to enable the first connection assembly and the second connection assembly to interlock with each other in a direction along a second axis perpendicular to a first axis.

14. A method of detachably interconnecting an electronic device and an additional device along a first axis comprising:
moving a first section of one of the electronic device and the additional device in a first direction along a second axis perpendicular to the first axis and towards a second section of the electronic device and the additional device;
generating movement of a movable structure of the second section along the second axis and towards a stationary structure of a first connection assembly using an attracting force between the stationary structure and the movable structure;
aligning the movable structure with the stationary structure by engaging the movable structure with the stationary structure;
engaging and pivoting the movable structure with a pivotable element of the first connection assembly and simultaneously engaging the pivotable element with a second connection assembly to cause a slidable element of the second connection assembly to slide in a third direction parallel with the first axis; and
engaging and interlocking the slidable element with the pivotable element to cause the first connection assembly to interlock with the second connection assembly.

15. The method of claim 14, further comprising:
moving the slidable element in a fourth direction parallel with the first axis to cause the slidable element to disengage the pivotable element;
applying a manual force on the electronic device or the additional device in a second direction, along the second axis, and away from an opposing electronic device or additional device, wherein the manual force is higher than the attracting force;
disengaging the movable structure from the pivotable element to cause the pivotable element to pivot back to a first retracted position, wherein the pivotable element forms a first slot cover; and
moving the movable structure in the second direction along the second axis to a second retracted position, wherein the movable structure forms a second slot cover.

16. The system of claim 13, wherein the stationary structure is configured to generate movement of the partially movable structure in a first direction towards the stationary structure along the second axis, and wherein the partially movable structure is further configured to engage with the stationary structure in response to the movement to cause the movable structure to be aligned with the stationary structure along the first axis.

17. The system of claim 13, wherein the pivotable element is configured to pivot around a third axis perpendicular to the first axis and the second axis to cause the pivotable element to pivot between a retracted position and a protruding position, and engage with the slidable element when in the protruding position.

18. The system of claim 13, wherein the second connection assembly further comprises a compression spring configured to generate a spring force in a second direction along the second axis, and wherein the spring force biases a part of the partially movable structure to maintain a retracted position when the spring force exceeds a movement force generated by the stationary structure on the partially movable structure in the first direction.

19. The system of claim 13, wherein the partially movable structure comprises:
a first magnetic assembly; and
a pin,
wherein the stationary structure comprises:
a second magnetic assembly; and
a recess configured to accommodate the pin, and
wherein the connection arrangement is configured to self-align using the recess as the partially movable structure is moved towards the stationary structure.

20. The system of claim 19, wherein the pin is configured to engage with the pivotable element to cause the pivotable element to pivot from a retracted position to a protruding position as the pin moves into the recess.

* * * * *